United States Patent
Leist

(10) Patent No.: US 9,689,074 B2
(45) Date of Patent: Jun. 27, 2017

(54) LOW DRAG COATING CONTAINING BORON NITRIDE POWDER

(71) Applicant: MOMENTIVE PERFORMANCE MATERIALS, INC., Waterford, NY (US)

(72) Inventor: Jon Leist, North Olmsted, OH (US)

(73) Assignee: MOMENTIVE PERFORMANCE MATERIALS, INC., Waterford, NY (US)

( * ) Notice: Subject to any disclaimer, the term of this patent is extended or adjusted under 35 U.S.C. 154(b) by 114 days.

(21) Appl. No.: 14/379,896

(22) PCT Filed: Feb. 22, 2013

(86) PCT No.: PCT/US2013/027388
§ 371 (c)(1),
(2) Date: Aug. 20, 2014

(87) PCT Pub. No.: WO2013/130360
PCT Pub. Date: Sep. 6, 2013

(65) Prior Publication Data
US 2014/0373965 A1 Dec. 25, 2014

Related U.S. Application Data

(60) Provisional application No. 61/603,551, filed on Feb. 27, 2012.

(51) Int. Cl.
*C23C 26/00* (2006.01)
*F16L 58/04* (2006.01)
*C08K 3/38* (2006.01)

(52) U.S. Cl.
CPC .............. *C23C 26/00* (2013.01); *C08K 3/38* (2013.01); *F16L 58/04* (2013.01); *C08K 2003/385* (2013.01)

(58) Field of Classification Search
CPC ...... C23C 26/00; C08K 3/38; C08K 2003/385
See application file for complete search history.

(56) References Cited

U.S. PATENT DOCUMENTS

| | | | |
|---|---|---|---|
| 5,007,962 A | 4/1991 | Osborne | |
| 6,524,694 B1 | 2/2003 | Phillips | |
| 2002/0142161 A1* | 10/2002 | Grimes | ................ H01F 41/12 428/375 |
| 2010/0200801 A1 | 8/2010 | Ramasamy et al. | |

FOREIGN PATENT DOCUMENTS

WO WO2012/000935 1/2012

OTHER PUBLICATIONS

International Search Report and the Written Opinion of the International Searching Authority, PCT/US2013/027388, Momentive Performance Materials Inc., Apr. 26, 2013.
International Preliminary Report on Patentability dated Sep. 2, 2014 received from the International Bureau.

* cited by examiner

*Primary Examiner* — Robert Harlan
(74) *Attorney, Agent, or Firm* — Joseph Waters; McDonald Hopkins LLC

(57) ABSTRACT

The present invention relates to coatings having improved resistance to corrosion and/or abrasion. In one embodiment, the compositions disclosed herein comprise at least one resin material in combination with at least one type of boron nitride powder. In another embodiment, the compositions disclosed herein comprise at least one resin in combination with at least one type of boron nitride powder, wherein the amount of boron nitride powder in the coating material is in the range of about 1 weight percent to about 25 weight percent.

25 Claims, No Drawings

LOW DRAG COATING CONTAINING BORON NITRIDE POWDER

CROSS REFERENCE TO RELATED APPLICATIONS

This application is a 35 U.S.C. 371 national stage filing and claims priority to PCT Application No. PCT/US2013/027388, entitled "Low Drag Coating Containing Boron Nitride Powder" filed on Feb. 22, 2013, which claims the benefit of U.S. Provisional Application No. 61/603,551 entitled "Low Drag Coatings Containing Boron Nitride Powder" filed on Feb. 27, 2012, both of which are incorporated herein in their entirety by reference.

FIELD OF THE INVENTION

The present invention relates to coatings having improved resistance to corrosion and/or abrasion. In one embodiment, the compositions disclosed herein comprise at least one resin material in combination with at least one type of boron nitride powder. In another embodiment, the compositions disclosed herein comprise at least one resin in combination with at least one type of boron nitride powder, wherein the amount of boron nitride powder in the coating material is in the range of about 1 weight percent to about 25 weight percent.

BACKGROUND OF THE INVENTION

As is well known to those of skill in the art, various surfaces are subject to corrosive and/or abrasive environments. For example, pipes utilized to transport various materials (e.g., oil, or other oil-based products) are subjected to increased corrosive and/or abrasive forces that can cause the interior surfaces of such pipes to age more quickly. To date, a variety of coatings have been utilized to coat the internal surfaces of such pipes to provide some form of increased corrosion- and/or abrasion-resistance. Materials for such coatings include tungsten disulfide, molybdenum disulfide, graphite, and polytetrafluoroethylene (PTFE). One example is a resin material that contains tungsten disulfide powder. However, coatings such as these suffer from various drawbacks. For example, corrosion- and/or abrasion-resistant coatings that contain tungsten disulfide suffer an undesirable amount of material loss when subjected to the friction associated with the transport of material through a coated pipe. Molybdenum disulfide and PTFE coatings are limited in temperature rating, which limits the environments and conditions under which they can be used. Graphite is reactive in the pipeline internal environment.

Accordingly, there is a need in the art for low drag coatings that offer improved corrosion and/or abrasion resistance.

SUMMARY OF THE INVENTION

The present invention relates to coatings having improved resistance to corrosion and/or abrasion. In one embodiment, the compositions disclosed herein comprise at least one resin material in combination with at least one type of boron nitride powder. In another embodiment, the compositions disclosed herein comprise at least one resin in combination with at least one type of boron nitride powder, wherein the amount of boron nitride powder in the coating material is in the range of about 1 weight percent to about 25 weight percent.

In one embodiment, the present invention relates to a coating composition as disclosed and described herein.

In another embodiment, the present invention relates to a coating composition comprising at least one resin material and at least one boron nitride powder.

In still another embodiment, the present invention relates to a coating composition comprising at least one resin material and at least one boron nitride powder, wherein the amount of boron nitride powder in the coating material is in the range of about 5 weight percent to about 25 weight percent.

In another aspect, the present invention provides a pipe for conveying a fluid having an inner surface coated with the composition comprising at least one resin in combination with at least one type of boron nitride powder.

The coating compositions can provide a coated surface that exhibits excellent properties including, low drag, low coefficient of friction, chemical resistance to a variety of substances, low abrasion, excellent mechanical strength, or a combination of two or more thereof. The coatings can exhibit properties comparable to or better than sulfide based coatings such as tungsten disulfide at comparable loadings. While providing properties comparable or better than tungsten disulfide coatings, the present coatings exhibit excellent corrosion resistance without producing the harmful byproducts produced by sulfide based coatings, such as molybdenum disulfide or tungsten disulfide, when exposed to corrosive or acidic conditions. The present coatings provide good lubricity and abrasion resistance but are generally non-reactive and do not produce corrosive components or byproducts under operating conditions.

In one aspect, the present invention provides, a coating composition comprising at least one resin material; and at least one boron nitride powder, wherein the amount of boron nitride powder in the coating material is in the range of about 1 weight percent to about 25 weight percent.

In one embodiment, the boron nitride powder is chosen platelet-shaped boron nitride, agglomerates of boron nitride, spherical shaped boron nitride, elliptical shaped boron nitride, and combinations of two or more thereof.

In one embodiment, the boron nitride powder comprises boron nitride having a crystal size of about 1 micron or less. In one embodiment, the boron nitride powder comprises boron nitride having a crystal size of about 0.7 micron or less. In one embodiment, the boron nitride powder comprises boron nitride having a crystal size of about 0.5 micron or less. In one embodiment, the boron nitride powder comprises boron nitride having a crystal size of about 0.1 micron to about 10 microns. In one embodiment, the boron nitride powder comprises boron nitride having a crystal size of about 0.2 micron to about 0.5 micron.

In one embodiment, the boron nitride powder comprises boron nitride agglomerates having an agglomerate size of from about 0.5 micron to about 50 microns. In one embodiment, the boron nitride powder comprises boron nitride agglomerates having an agglomerate size of from about 0.7 micron to about 10 microns.

In one embodiment, the resin material comprises a thermoset resin. In one embodiment, the resin material comprises a phenol-formaldehyde resin, a phenol resin, a melamine resin, an epoxy resin, or a combination of two or more thereof.

In one embodiment, the resin material comprises a thermoplastic resin.

In one embodiment, the resin material comprises an acrylonitrile butadiene styrene (ABS), an acrylic, a cyclic olefinic copolymer (COC), an ethylene-vinyl acetate (EVA), a fluoroplastic, acrylic/PVC alloys, a polyacrylate, a polyacrylonitrile (PANs or acrylonitriles), a polyamide, a polyamide-imide (PM), a polyaryletherketone, a polybutadiene (PBD), a polybutylene (PB), a polybutylene terephthalate (PBT), a polycaprolactone (PCL), a polychlorotrifluoroethylene (PCTFEs), a polyethylene terephthalate (PET), polycyclohexylene dimethylene terephthalate (PCT), a polycarbonate (PC), a polyhydroxyalkanoate (PHA), polyketone (PK), a polyester, a polyethylene (PE), a polyetheretherketone (PEEK), a polyetherketoneketone (PEKK), a polyetherimide (PEI), a polyethersulfone (PES), a chlorinated polyethylene (CPE), a polyimide (PI), a polymethylpentene (PMP), a polyphenylene oxide (PPO), a polyphenylene sulfide (PPS), a polyphthalamide (PPA), a polypropylene (PP), a polystyrene (PS), a polysulfone (PSU), a polytrimethylene terephthalate (PTT), a polyurethane (PU), a polyvinyl acetate (PVA), a polyvinyl chloride (PVC), a polyvinylidene chloride (PVDC), a styrene-acrylonitrile (SAN), or a combination of two or more thereof.

In one embodiment, the amount of boron nitride in the coating material is in the range of about 2.5 weight percent to about 20 weight percent. In one embodiment, the amount of boron nitride in the coating material is in the range of about 5 weight percent to about 15 weight percent. In one embodiment, the amount of boron nitride in the coating material is in the range of about 2.5 weight percent to about 20 weight percent.

In one embodiment, the coating composition is a liquid.

In one embodiment, the coating composition is a powder coating.

In one embodiment, a surface coated with the composition has a coefficient of friction (tan α) of about 0.3 or less. In one embodiment, a surface coated with the composition has a coefficient of friction (tan α) of about 0.25 or less. In one embodiment, a surface coated with the composition has a coefficient of friction (tan α) of about 0.2 or less. In one embodiment, a surface coated with the composition has a coefficient of friction (tan α) of from about 0.15 to about 0.3. In one embodiment, a surface coated with the composition has a coefficient of friction (tan α) of from about 0.17 to about 0.27.

In another aspect, the present invention provides a pipe for conveying a fluid comprising an outer surface, an inner surface, and a channel disposed radially inward of the inner surface wherein at least a portion of the inner surface of the pipe is coated with a coating composition in accordance with present invention including aspects and embodiments thereof.

In one embodiment, the pipe comprises a metal or a metal alloy. In one embodiment, the pipe comprises a steel, titanium, nickel, zirconium, aluminum or alloys of two or more thereof. In one embodiment, the pipe comprises stainless steel or a corrosion resistance steel.

In one embodiment, the inner surface of the pipe coated with the coating composition has a coefficient of friction (tan α) of about 0.3 or less. In one embodiment, inner surface coated with the coating composition has a coefficient of friction (tan α) of about 0.25 or less. In one embodiment, the inner surface coated with the coating composition has a coefficient of friction (tan α) of about 0.2 or less. In one embodiment, the inner surface coated with the coating composition has a coefficient of friction (tan α) of from about 0.15 to about 0.3. In one embodiment, the inner surface coated with the coating composition has a coefficient of friction (tan α) of from about 0.17 to about 0.27.

These and other aspects of the coating compositions can be further understood with reference to the following detailed description.

DETAILED DESCRIPTION

The present invention relates to coatings having improved resistance to corrosion and/or abrasion. In one embodiment, the compositions disclosed herein comprise at least one resin material in combination with at least one type of boron nitride powder. In another embodiment, the compositions disclosed herein comprise at least one resin in combination with at least one type of boron nitride powder, wherein the amount of boron nitride powder in the coating material is in the range of about 1 weight percent to about 25 weight percent.

Coating Material:

The coating material that is utilized in conjunction with the at least one boron nitride powder of the present invention is selected from one or more thermoset polymers or one or more thermoplastic polymers.

In one embodiment, suitable thermoset polymers for use in conjunction with the present invention include, but are not limited to, a phenol-formaldehyde resin, phenol resin, melamine resin, an epoxy resin (e.g., fusion-bonded epoxies), a polyimide, or suitable combinations of two or more thereof. In one embodiment, suitable thermoplastic polymers for use in conjunction with the present invention include, but are not limited to, an acrylonitrile butadiene styrene (ABS), an acrylic (e.g., PMMA), a cyclic olefinic copolymer (COC), an ethylene-vinyl acetate (EVA), a fluoroplastic (e.g., PTFE, FEP, PFA, CTFE, ECTFE, ETFE), acrylic/PVC alloys, polyacrylates (e.g., acrylics), a polyacrylonitrile (PANs or acrylonitriles), a polyamide (PA or Nylon), a polyamide-imide (PAI), a polyaryletherketone (e.g., PAEK or ketones), a polybutadiene (PBD), a polybutylene (PB), a polybutylene terephthalate (PBT), a polycaprolactone (PCL), a polychlorotrifluoroethylene (PCTFEs), a polyethylene terephthalate (PET), polycyclohexylene dimethylene terephthalate (PCT), a polycarbonate (PC), a polyhydroxyalkanoate (PHA), polyketone (PK), a polyester, a polyethylene (PE), a polyetheretherketone (PEEK), a polyetherketoneketone (PEKK), a polyetherimide (PEI), a polyethersulfone (PES), a chlorinated polyethylene (CPE), a polyimide (PI), a polymethylpentene (PMP), a polyphenylene oxide (PPO), a polyphenylene sulfide (PPS), a polyphthalamide (PPA), a polypropylene (PP), a polystyrene (PS), a polysulfone (PSU), a polytrimethylene terephthalate (PTT), a polyurethane (PU), a polyvinyl acetate (PVA), a polyvinyl chloride (PVC), a polyvinylidene chloride (PVDC), a styrene-acrylonitrile (SAN), or suitable combination of two or more thereof.

In one embodiment, the coating material can be a liquid coating material. In the case of a liquid coating, the one or more boron nitride powders are added to the liquid coating at an appropriate weight percent to yield a liquid coating composition that contains the desired weight percentage of the one or more boron nitride powders. The liquid coating of the present invention is then applied to a desired surface to be protected by any suitable application technique (e.g., spin coating, casting, spraying, etc.).

In another embodiment, the coating material can be a powder coating material. In the case of a powder coating material the one or more boron nitride powders are mixed, at an appropriate weight percent, with the one or more powdered coating materials. The resulting mixed powder is then, for example, milled and applied to a surface to be protected by any suitable powder coating technique (e.g., charged powder coating techniques).

Boron Nitride Powder Material:

In one embodiment, the one or more boron nitride powders utilized in conjunction with the present invention are selected from boron nitride powders having a variety of particle geometries. Suitable particle geometries for use in conjunction with the present invention include, but are not limited to, platelet-shaped, agglomerates, spherical, elliptical, irregular, or any suitable combination of two or more thereof.

In one embodiment, suitable boron nitride powders are available from Momentive (Columbus, Ohio) under the trade designations PT110 (platelet-shaped particles), HCV (agglomerates), CF600 (agglomerates), NX1 (agglomerates), NX10 (agglomerates), PT140 (platelet-shaped particles), PT396 (agglomerates), or combinations of two or more thereof.

In one embodiment, the amount of the one or more boron nitride powders in the coating compositions of the present invention is in the range of about 1 weight percent to about 25 weight percent, or from about 2 weight percent to about 22.5 weight percent, or from about 2.5 weight percent to about 20 weight percent, or from about 4 weight percent to about 17.5 weight percent, or from about 5 weight percent to about 15 weight percent, or from about 7 weight percent to about 14 weight percent, or even from about 10 weight percent to about 12.5 weight percent. In one embodiment, the amount of boron nitride present in the coating compositions is in the range of from about 2 weight percent to about 10 weight percent. Here, as well as elsewhere in the specification and claims, individual numerical values, or limits, from one or more embodiments and/or different ranges can be combined to form additional non-disclosed and/or non-stated ranges.

In still another embodiment, any suitable type and/or particle geometry of boron nitride can be utilized in conjunction with the present invention. In one embodiment, the one or more boron nitride powders have a crystal size of less than about 10 microns, less than about 7 microns, less than about 5 microns, less than about 2 microns, less than about 1 micron, even less then about 0.5 microns. In one embodiment the boron nitride powder has a crystal size of from about 0.1 micron to about 10 micron, from about 0.2 micron to about 5 micron, even about 0.5 to about 1 micron. Here, as well as elsewhere in the specification and claims, individual numerical values, or limits, from one or more embodiments and/or different ranges can be combined to form additional non-disclosed and/or non-stated ranges. In another embodiment, the boron nitride powders have a crystal size of about 0.5 microns or less, a purity of about 0.5 percent soluble borate or less, and a crystallinity described by graphitization index of 10 or less.

In one embodiment, the boron nitride powder comprises boron nitride agglomerates. In one embodiment the agglomerates have an agglomerate size of from about 1 micron to about 50 microns, from about 5 microns to about 25 microns, even from about 10 to about 20 microns. Here, as well as elsewhere in the specification and claims, individual numerical values, or limits, from one or more embodiments and/or different ranges can be combined to form additional non-disclosed and/or non-stated ranges. In one embodiment the agglomerates comprise boron nitride having a crystal size of from about 0.1 micron to about 10 microns, from about 0.2 microns to about 5 microns, even from about 0.5 microns to about 1 micron.

The present coatings can be used in a variety of applications. In one embodiment, the coatings are adapted to be applied to a surface to provide a surface exhibiting a low drag, reduced coefficient of friction, etc. In one embodiment, a surface coated with a coating composition in accordance with aspects of the invention has a coefficient of friction (tan $\alpha$) of less than about 0.3; less than about 0.27; less than about 0.25; less than about 0.22; less than about 0.2; less than about 0.17; even less than about 0.15. In one embodiment, a surface coated with the coating composition has a coefficient of friction (tan $\alpha$) of from about 0.15 to about 0.3; from about 0.17 to about 0.27; even from about 0.2 to about 0.25. Here, as well as elsewhere in the specification and claims, individual numerical values, or limits, from one or more embodiments and/or different ranges can be combined to form additional non-disclosed and/or non-stated ranges. The coefficient of friction is a coefficient of friction that is determined on a slanted plane that is tilted at an angle $\alpha$. The angle $\alpha$ at which a weight arranged on the plane will slide determines the coefficient of friction. The coefficient of friction evaluated in this manner is a coefficient of friction of rest or static friction or a starting coefficient of friction, in contrast to the coefficient of sliding friction or dynamic coefficient of friction.

In one embodiment, the coatings of the present invention are designed to be applied to the internal surfaces of pipes for accessing and/or transporting corrosive and/or abrasive crude oil and/or natural gas. One advantage of the present invention in this embodiment is that the previously utilized tungsten disulfide creates corrosive hydrogen sulfide in the presence of water. On the other hand, the boron nitride powder(s) of the present invention do not yield a strong corrosive compound such as hydrogen sulfide. Instead, if at all, only a minor amount of boric acid is formed if water is present.

In one embodiment, a pipe for conveying a fluid comprises an outer surface, an inner surface, and a volume or channel disposed radially inward of the inner surface, the volume or channel adapted to convey a fluid. A coating composition in accordance with aspects of the present invention is disposed on at least a portion of the inner surface. In one embodiment, substantially the entire area of the inner surface comprises the coating material. The pipe can be formed from any material as desired for a particular purpose or intended use. In one embodiment, the pipe is formed from steel, stainless steel, corrosion resistant steel, nickel, zirconium, titanium, aluminum, or alloys of two or more thereof.

While not wishing to be bound to any one advantage, the coatings of the present invention possess improved wear rates when compared to similar coatings that contain tungsten disulfide powder. For example, as illustrated in the tables below, fusion bonded epoxy powder coatings that possess a 10 weight percent loading with NX-series boron nitride powders from Momentive show only 2 percent material loss after a 1000 cycle Taber abrasion test using a CS-17 wheel and 1 kilogram loading. In contrast, material loss was 35 percent for similar loadings of comparative tungsten disulfide powder (grade MK-WS$_2$-06 from Lower Friction LLC). In one embodiment, the coatings of the present invention are designed to be applied to the internal surfaces of pipes for accessing and/or transporting corrosive and/or abrasive crude oil and/or natural gas. One advantage of the present invention in this embodiment is that the previously utilized disulfides such as tungsten disulfide, molybdenum disulfide, etc. create hydrogen sulfide in the presence of water, which is corrosive and can contribute to pipe corrosion and even failure. On the other hand, the boron nitride powder(s) of the present invention do not yield a strong corrosive compound such as hydrogen sulfide. Instead, if at all, only a minor amount of boric acid is formed if water is present.

Additional non-limiting examples are detailed in Table 1, Table 2 and Table 3 below. Table 3 contains the Taber abrasion test data from the examples of Table 2. As illustrated in the examples, the present coatings exhibit properties comparable to or superior to tungsten disulfide coatings, including coefficient of friction, impact resistance, abrasion resistance, etc., while providing excellent chemical resistance.

TABLE 1

| Powder Type (Trade Name) | Material | Morph. | Graph Index | D50 (μ) | Surface area (m$^2$/g) | Percent Soluble Borates | Loading (wt. %) | Pellet Flow (mm) | Coefficient of Friction Hypo. (mm) | Height (mm) | Angle | Gloss % (60° specular) | Pencil Hardness | Solvent Resistance | Impact Resistance (in-lbs) |
|---|---|---|---|---|---|---|---|---|---|---|---|---|---|---|---|
| Control | BS | — | | | | — | 10% | 69 | 153 | 40 | 15.15 | 104.1 | 4H | Excellent | 160 |
| PT110 | BN | P | 1.0 | 49.5 | 0.49 | 0.04 | 2.5% | 62 | 153 | 42 | 15.93 | 101.1 | 4H | Excellent | 140 |
| PT110 | BN | P | 1.0 | 49.5 | 0.49 | 0.04 | 5% | 49 | 153 | 39 | 14.77 | 95.5 | 3H | Excellent | 140 |
| PT110 | BN | P | 1.0 | 49.5 | 0.49 | 0.04 | 10% | 40 | 153 | 43 | 16.32 | 89.7 | H | Excellent | 140 |
| HCV | BN | AG | Infinite | 8.5 | 40.08 | 0.32 | 2.5% | 60 | 153 | 31 | 11.69 | 103.1 | 4H | Very Slight Reduction of Gloss | 140 |
| HCV | BN | AG | Infinite | 8.5 | 40.08 | 0.32 | 5% | 62 | 153 | 35 | 13.22 | 102.3 | 3H | Very Slight Reduction of Gloss | 140 |
| HCV | BN | AG | Infinite | 8.5 | 40.08 | 0.32 | 10% | 49 | 153 | 39 | 14.77 | 99.3 | 3H | Slight Reduction of Gloss | 140 |
| CF600 | BN | AG | 1.5 | 16.0 | 6.00 | 0.15 | 2.5% | 57 | 153 | 37 | 13.99 | 102.3 | 2H | Very Slight Reduction of Gloss | 120 |
| CF600 | BN | AG | 1.5 | 16.0 | 6.00 | 0.15 | 5% | 46 | 153 | 35 | 13.22 | 98.6 | 2H | Very Slight Reduction of Gloss | 120 |
| CF600 | BN | AG | 1.5 | 16.0 | 6.00 | 0.15 | 10% | 40 | 153 | 33 | 12.46 | 88.6 | H | Very Slight Reduction of Gloss | 80 |

BN = boron nitride; BS = barium sulfate (BaSO$_4$)
Morph. = morphology were P stands for platelet; and AG stands for agglomerate
Hypo. stands for hypotenuse

TABLE 2

| Powder Type (Trade Name) | Material | Morph. | Graph Index | D50 (μ) | Surface area (m$^2$/g) | Percent Soluble Borates | Loading (wt. %) | Pellet Flow (mm) | Coefficient of Friction Hypo. (mm) | Height (mm) | Angle | Gloss % (60° specular) | Pencil Hardness | Solvent Resistance | Impact Resistance (in-lbs) |
|---|---|---|---|---|---|---|---|---|---|---|---|---|---|---|---|
| Control | BS | — | | | | — | 10% | | 127 | 32 | 14.14 | 104.6 | 4H | Excellent | 160 |
| NX1 | BN | AG | 4.0 | 0.8 | 15.90 | 0.11 | 2.5% | 47 | 127 | 34 | 14.99 | 99.3 | 2H | Excellent | 160 |
| NX1 | BN | AG | 4.0 | 0.8 | 15.90 | 0.11 | 5% | 29 | 127 | 30 | 13.29 | 101.5 | 2H | Excellent | 160 |
| NX1 | BN | AG | 4.0 | 0.8 | 15.90 | 0.11 | 10% | 27 | 127 | 28 | 12.43 | 101.5 | 2H | Excellent | 160 |
| NX10 | BN | AG | 4.0 | 10.5 | 12.33 | 0.21 | 2.5% | 56 | 127 | 29 | 12.86 | 107.3 | 2H | Excellent | 160 |
| NX10 | BN | AG | 4.0 | 10.5 | 12.33 | 0.21 | 5% | 43 | 127 | 27 | 12 | 108.2 | 3H | Excellent | 160 |
| NX10 | BN | AG | 4.0 | 10.5 | 12.33 | 0.21 | 10% | 34 | 127 | 26 | 11.57 | 108 | 2H | Very Slight | 160 |
| PT100 | BN | AG | 1.7 | 13.8 | 5.89 | 0.11 | 2.5% | 49 | 127 | 25 | 11.14 | 101.6 | 2H | Very Slight | 160 |
| PT100 | BN | AG | 1.7 | 13.8 | 5.89 | 0.11 | 5% | 39 | 127 | 28 | 12.43 | 98.8 | 2H | Slight | 160 |
| PT100 | BN | AG | 1.7 | 13.8 | 5.89 | 0.11 | 10% | 29 | 127 | 25 | 11.14 | 78 | 2H | Slight | 160 |
| PT140 | BN | P | 1.5 | 11.1 | 5.72 | 0.20 | 2.5% | 60 | 127 | 24 | 10.7 | 100.3 | 3H | Excellent | 160 |
| PT140 | BN | P | 1.5 | 11.1 | 5.72 | 0.20 | 5% | 48 | 127 | 23 | 10.27 | 99.7 | 2H | Slight | 160 |
| PT140 | BN | P | 1.5 | 11.1 | 5.72 | 0.20 | 10% | 42 | 127 | 30 | 13.29 | 93.3 | H | Slight | 160 |
| PT396 | BN | AG | | 68 | 8.55 | 0.25 | 2.5% | 50 | 127 | 28 | 12.43 | 102 | 3H | Excellent | 160 |
| PT396 | BN | AG | | 68 | 8.55 | 0.25 | 5% | 40 | 127 | 29 | 12.86 | 100.4 | H | Excellent | 160 |
| PT396 | BN | AG | | 68 | 8.55 | 0.25 | 10% | 41 | 127 | 30 | 13.29 | 77.6 | H | Excellent | 140 |
| MK-WS$_2$-06 | WS$_2$ | P | | | | | 2.5% | 65 | 127 | 29 | 12.86 | 97.5 | 4H | Slight | 160 |
| MK-WS$_2$-06 | WS$_2$ | P | | | | | 5% | 74 | 127 | 27 | 12 | 103.7 | 4H | Medium | 160 |

TABLE 2-continued

| Powder Type (Trade Name) | Material | Morph. | Graph Index | D50 (μ) | Surface area (m²/g) | Percent Soluble Borates | Pellet Loading (wt. %) | Flow (mm) | Coefficient of Friction Hypo. (mm) | Height (mm) | Angle | Gloss % (60° spec-ular) | Pencil Hard-ness | Solvent Resistance | Impact Resis-tance (in-lbs) |
|---|---|---|---|---|---|---|---|---|---|---|---|---|---|---|---|
| MK-WS₂-06 | WS₂ | P | | | | — | 10% | 65 | 127 | 26 | 11.57 | 104.1 | 3H | Medium | 160 |

BN = boron nitride; BS = barium sulfate (BaSO₄)
Morph. = morphology were P stands for platelet; and AG stands for agglomerate
Hypo. stands for hypotenuse

TABLE 3

| Powder Type (Trade Name) | Material | Morph. | Loading (wt. %) | Taber Abrasion Test | | | |
|---|---|---|---|---|---|---|---|
| | | | | Initial Weight (g) | 1000 Cycles | De-crease (g) | Percent De-crease |
| Control | BS | — | 10% | 2.21 | 2.18 | 0.03 | 1.4 |
| NX1 | BN | AG | 10% | 1.71 | 1.68 | 0.03 | 1.8 |
| NX10 | BN | AG | 10% | 1.84 | 1.82 | 0.02 | 1.1 |
| PT100 | BN | AG | 10% | 2.16 | 1.67 | 0.49 | 22.7 |
| PT140 | BN | P | 10% | 2.09 | 1.57 | 0.52 | 24.9 |
| PT396 | BN | AG | 10% | 1.4 | 0.89 | 0.51 | 36.4 |
| MK-WS₂-06 | WS₂ | P | 10% | 1.45 | 0.94 | 0.51 | 35.2 |

BN = boron nitride; BS = barium sulfate (BaSO₄)
Morph. = morphology were P stands for platelet; and AG stands for agglomerate While the invention has been described with reference to a various embodiment, those skilled in the art will understand that various changes can be made and equivalents can be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A coating composition comprising:
   at least one resin material; and
   at least one boron nitride powder,
   wherein the amount of boron nitride powder in the coating material is in the range of about 1 weight percent to about 25 weight percent, and wherein the coating composition coats a surface of a pipe having a coefficient of friction (tan α) of about 0.3 or less, and comprising an outer surface, an inner surface, and a channel disposed radially inward of the inner surface, the composition coating at least a portion of the inner surface of the pipe.

2. The coating composition of claim 1, wherein the boron nitride powder is chosen from platelet-shaped boron nitride, agglomerates of boron nitride, spherical shaped boron nitride, elliptical shaped boron nitride, and combinations of two or more thereof.

3. The coating composition of claim 1, wherein the boron nitride powder comprises boron nitride having a crystal size of about 1 micron or less.

4. The coating composition of claim 1, wherein the boron nitride powder comprises boron nitride having a crystal size of about 0.7 micron or less.

5. The coating composition of claim 1, wherein the boron nitride powder comprises boron nitride having a crystal size of about 0.5 micron or less.

6. The coating composition of claim 1, wherein the boron nitride powder comprises boron nitride having a crystal size of about 0.1 micron to about 10 microns.

7. The coating composition of claim 1, wherein the boron nitride powder comprises boron nitride having a crystal size of about 0.2 micron to about 0.5 micron.

8. The coating composition of claim 1, wherein the boron nitride powder comprises boron nitride agglomerates having an agglomerate size of from about 0.5 micron to about 50 microns.

9. The coating composition of claim 1, wherein the boron nitride powder comprises boron nitride agglomerates having an agglomerate size of from about 0.7 micron to about 10 microns.

10. The coating composition of claim 1, wherein the resin material comprises a thermoset resin.

11. The coating composition of claim 10, wherein the resin material comprises a phenol-formaldehyde resin, a phenol resin, a melamine resin, an epoxy resin, or a combination of two or more thereof.

12. The coating composition of claim 1, wherein the resin material comprises a thermoplastic resin.

13. The coating composition of claim 12, wherein the resin material comprises an acrylonitrile butadiene styrene (ABS), an acrylic, a cyclic olefinic copolymer (COC), an ethylene-vinyl acetate (EVA), a fluoroplastic, acrylic/PVC alloys, a polyacrylate, a polyacrylonitrile (PANs or acrylonitriles), a polyamide, a polyamide-imide (PAI), a polyaryletherketone, a polybutadiene (PBD), a polybutylene (PB), a polybutylene terephthalate (PBT), a polycaprolactone (PCL), a polychlorotrifluoroethylene (PCTFEs), a polyethylene terephthalate (PET), polycyclohexylene dimethylene terephthalate (PCT), a polycarbonate (PC), a polyhydroxyalkanoate (PHA), polyketone (PK), a polyester, a polyethylene (PE), a polyetheretherketone (PEEK), a polyetherketoneketone (PEKK), a polyetherimide (PEI), a polyethersulfone (PES), a chlorinated polyethylene (CPE), a polyimide (PI), a polymethylpentene (PMP), a polyphenylene oxide (PPO), a polyphenylene sulfide (PPS), a polyphthalamide (PPA), a polypropylene (PP), a polystyrene (PS), a polysulfone (PSU), a polytrimethylene terephthalate (PTT), a polyurethane (PU), a polyvinyl acetate (PVA), a polyvinyl chloride (PVC), a polyvinylidene chloride (PVDC), a styrene-acrylonitrile (SAN), or a combination of two or more thereof.

14. The coating composition of claim 1, wherein the amount of boron nitride in the coating material is in the range of about 2.5 weight percent to about 20 weight percent.

15. The coating composition of claim 1, wherein the amount of boron nitride in the coating material is in the range of about 5 weight percent to about 15 weight percent.

16. The coating composition of claim 1, wherein the amount of boron nitride in the coating material is in the range of about 2.5 weight percent to about 20 weight percent.

17. The coating composition of claim 1, wherein the coating composition is a liquid.

18. The coating composition of claim 1, wherein the coating composition is a powder coating.

19. The coating composition of claim 1, wherein the pipe comprises a metal or a metal alloy.

20. The coating composition of claim 1, wherein the pipe comprises a steel, titanium, nickel, zirconium, aluminum or alloys of two or more thereof.

21. The coating composition of claim 1, wherein the pipe comprises stainless steel or a corrosion resistance steel.

22. The coating composition of claim 1, wherein the inner surface coated with the coating composition has a coefficient of friction (tan $\alpha$) of about 0.25 or less.

23. The coating composition of claim 1, wherein the inner surface coated with the coating composition has a coefficient of friction (tan $\alpha$) of about 0.2 or less.

24. The coating composition of claim 1, wherein the inner surface coated with the coating composition has a coefficient of friction (tan $\alpha$) of from about 0.15 to about 0.3.

25. The coating composition of claim 1, wherein the inner surface coated with the coating composition has a coefficient of friction (tan $\alpha$) of from about 0.17 to about 0.27.

\* \* \* \* \*